United States Patent
Miyata

(10) Patent No.: US 8,374,902 B2
(45) Date of Patent: Feb. 12, 2013

(54) INFORMATION PROCESSING APPARATUS AND INFORMATION PROCESSING METHOD

(75) Inventor: Junichi Miyata, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 371 days.

(21) Appl. No.: 12/750,764

(22) Filed: Mar. 31, 2010

(65) Prior Publication Data
US 2010/0262965 A1 Oct. 14, 2010

(30) Foreign Application Priority Data
Apr. 10, 2009 (JP) ................................. 2009-096457

(51) Int. Cl.
G06F 9/46 (2006.01)
(52) U.S. Cl. ...................................................... 705/7.27
(58) Field of Classification Search .................. 705/7.27
See application file for complete search history.

(56) References Cited

U.S. PATENT DOCUMENTS

| | | | |
|---|---|---|---|
| 7,359,084 B2 | 4/2008 | Nara et al. | 358/1.18 |
| 7,916,327 B2 * | 3/2011 | Yamaguchi | 358/1.15 |
| 2003/0004767 A1 * | 1/2003 | Ohsaki | 705/7 |
| 2005/0114766 A1 * | 5/2005 | Yamamoto | 715/527 |

FOREIGN PATENT DOCUMENTS

| | | |
|---|---|---|
| JP | 2003-162404 | 6/2003 |
| JP | 2006-202025 | 8/2006 |

* cited by examiner

*Primary Examiner* — Romain Jeanty
(74) *Attorney, Agent, or Firm* — Fitzpatrick, Cella, Harper & Scinto

(57) ABSTRACT

It is determined whether a workflow includes a process to be executed by an information processing apparatus. Upon determining that the workflow includes a process to be executed by the information processing apparatus, it is determined whether the workflow includes a process to be executed by an external apparatus in accordance with an instruction of the information processing apparatus. Upon determining that such process is not included, display is controlled to display a parameter for only the process to be executed by the information processing apparatus. Upon determining that such process is included, the function information of the external apparatus is acquired. After the function information has been acquired, display is controlled to display the parameters while reflecting the function information on the parameters of the processes of the workflow.

4 Claims, 13 Drawing Sheets

INFORMATION PROCESSING APPARATUS AND INFORMATION PROCESSING METHOD

BACKGROUND OF THE INVENTION

1. Field of the Invention

The present invention relates to an information processing apparatus and information processing method of executing processes of a workflow.

2. Description of the Related Art

In recent years, the process speed and image quality of an electrophotographic printing apparatus or an inkjet printing apparatus are becoming high. Along with this, a printed product generation method called print on demand (to be referred to as POD hereinafter) that aims to handle jobs of small lots in a short delivery time has emerged in contract to the conventional offset printing industry.

The POD market has assimilated digital devices and has made management and control using an information processing system more popular than in the conventional printing industry. In this POD field, efforts to raise the efficiency have been made by implementing automated print workflows using the JDF (Job Description Format) technique.

There also has been proposed a POD printing system using a desktop application, unlike the automatic workflow system using the JDF technique (Japanese Patent Laid-Open Nos. 2003-162404 and 2006-202025).

Japanese Patent Laid-Open No. 2003-162404 has proposed a method of prohibiting in advance the user from doing print format settings that lead to conflict. In this method, the function of a printer is acquired in advance from a separate system such as a printer driver for managing the function information of the printer, and a print format setting window based on the printer function is displayed. Using this method enables conflict control according to the printer function upon setting the print format. A setting window that displays only settable items is created on the print format setting window using the information of the function of the target printer, thereby performing conflict control.

In such control, however, only an output result within the range of the printer capability is obtained. For example, even when a general-purpose file independent of a printer is to be output to a selected printer, file output is done complying with the selected printer.

To solve this problem, Japanese Patent Laid-Open No. 2006-202025 has proposed a document processing method which uses print format settings for general purpose. Japanese Patent Laid-Open No. 2006-202025 describes determining the difference between document data print processing dependent on printer function and general-purpose output processing. To execute the general-purpose file output processing, the function of the target printer is set in a more advanced state, and the general-purpose file output processing is performed assuming that the file is output to a printer having an advanced function.

In Japanese Patent Laid-Open No. 2003-162404, however, before generating print data, an application always needs to set the output printer as the conflict control target as a preprocess. For this reason, even in, for example, an imposition process where printer information is unnecessary, the application needs printer information, resulting in overhead to acquire printer information and solve the conflict between printer settings.

In Japanese Patent Laid-Open No. 2006-202025, general-purpose file output is enabled by temporarily enhancing the capability of the reference output printer in accordance with print format settings. However, the general-purpose file output aims at outputting data with print settings to the output printer while reflecting the format. Hence, the information of the reference output printer is still necessary, resulting in overhead to acquire printer information and solve the conflict between printer settings.

As for a conventional desktop application, a user starts up the application on the desktop and orders data to be generated and printed via a user interface. Hence, the application cannot cope with a variety of automated workflows of, for example, the JDF system. More specifically, even when an application function requested from a workflow is a part of the workflow, all user interfaces of the application need to be displayed.

SUMMARY OF THE INVENTION

An aspect of the present invention is to eliminate the above-mentioned problems with the conventional technology.

The present invention provides an information processing apparatus and information processing method capable of appropriately controlling a user interface in accordance with a process included in a workflow.

The present invention in its first aspect provides an information processing apparatus which is used in a workflow including processes and executes the processes of the workflow, comprising: a display unit configured to display parameters of the processes of the workflow and accept settings of the parameters; a first determination unit configured to determine whether the workflow includes a process to be executed by the information processing apparatus; a second determination unit configured to, when the first determination unit has determined that the workflow includes the process to be executed by the information processing apparatus, determine whether the workflow includes a process to be executed by an external apparatus in accordance with an instruction of the information processing apparatus; a first display control unit configured to, when the second determination unit has determined that the process is not included, control the display unit to display a parameter for only the process to be executed by the information processing apparatus; an acquisition unit configured to, when the second determination unit has determined that the process is included, acquire function information of the external apparatus; and a second display control unit configured to, after the acquisition unit has acquired the function information of the external apparatus, control the display unit to display the parameters while reflecting the function information on the parameters of the processes of the workflow.

The present invention in its second aspect provides an information processing method executed by an information processing apparatus which is used in a workflow including processes and executes the processes of the workflow, comprising: a first determining step of determining whether the workflow includes a process to be executed by the information processing apparatus; a second determining step of, when it is determined in the first determining step that the workflow includes the process to be executed by the information processing apparatus, determining whether the workflow includes a process to be executed by an external apparatus in accordance with an instruction of the information processing apparatus; a first display step of, when it is determined in the second determining step that the process is not included, displaying a parameter for only the process to be executed by the information processing apparatus; an acquiring step of, when it is determined in the second determining step that the process is included, acquiring function information of the external apparatus; and a second display step of, after the function information of the external apparatus has been acquired in the acquiring step, displaying the parameters while reflecting the function information on the parameters of the processes of the workflow.

The present invention in its third aspect provides an information processing apparatus comprising: a receiving unit configured to receive instruction data that instructs execution of a plurality of processes; and a display control unit configured to control to display a setting window to set process contents associated with the plurality of processes included in the instruction data received by the receiving unit, and not to display a setting window to set process contents associated with processes which are not included in the instruction data.

The present invention in its fourth aspect provides an information processing method comprising: a receiving step of receiving instruction data that instructs execution of a plurality of processes; and a control step of controlling to display a setting window to set process contents associated with the plurality of processes included in the instruction data received in the receiving step, and not to display a setting window to set process contents associated with processes which are not included in the instruction data.

According to the present invention, it is possible to appropriately control a user interface in accordance with a process included in a workflow.

Further features of the present invention will become apparent from the following description of exemplary embodiments with reference to the attached drawings.

DESCRIPTION OF THE EMBODIMENTS

Figure 1:
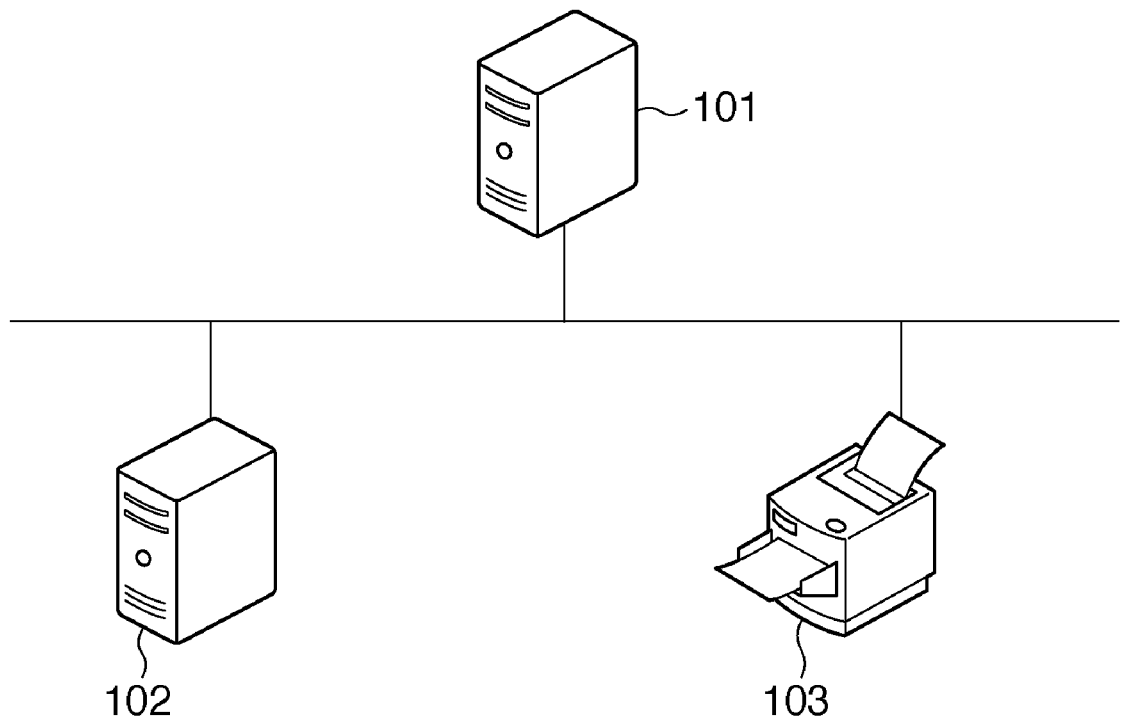
FIG. 1 is a view showing the overall arrangement of a printing system including an information processing apparatus.

Preferred embodiments of the present invention will now be described hereinafter in detail, with reference to the accompanying drawings. It is to be understood that the following embodiments are not intended to limit the claims of the present invention, and that not all of the combinations of the aspects that are described according to the following embodiments are necessarily required with respect to the means to solve the problems according to the present invention.

Note that the same reference numerals denote the same constituent elements, and a description thereof will be omitted.

FIG. 1 is a view showing the overall arrangement of a printing system including an information processing apparatus according to the present invention. Referring to FIG. 1, a workflow management PC 101 issues a print job or an imposition job and manages whole jobs. Note that in this embodiment, a combination of processes such as "performing an imposition process first and a print process then" is defined as a "workflow". An information processing apparatus 102 is a prepress PC that executes a prepress process such as a print data imposition process based on a process instruction from the workflow management PC 101. A digital printer 103 receives the prepressed print job which has undergone the imposition process and the like by the prepress PC 102, and executes the actual print process.

Figure 2A:
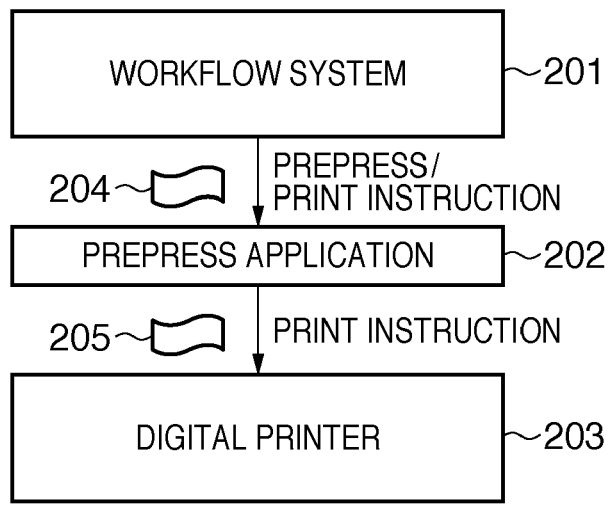
FIG. 2A is a first block diagram showing details of a software configuration on the information processing apparatus.
Figure 2B:
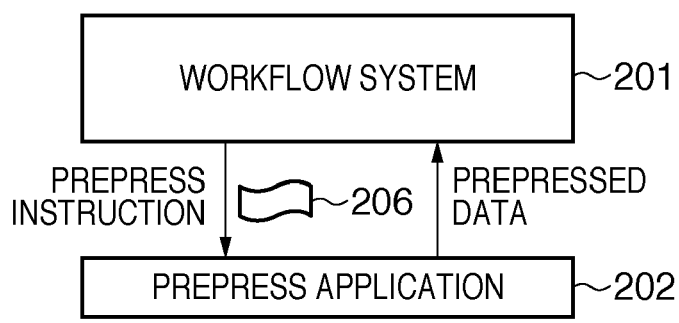
FIG. 2B is a second block diagram showing details of the software configuration on the information processing apparatus.
Figure 2C:
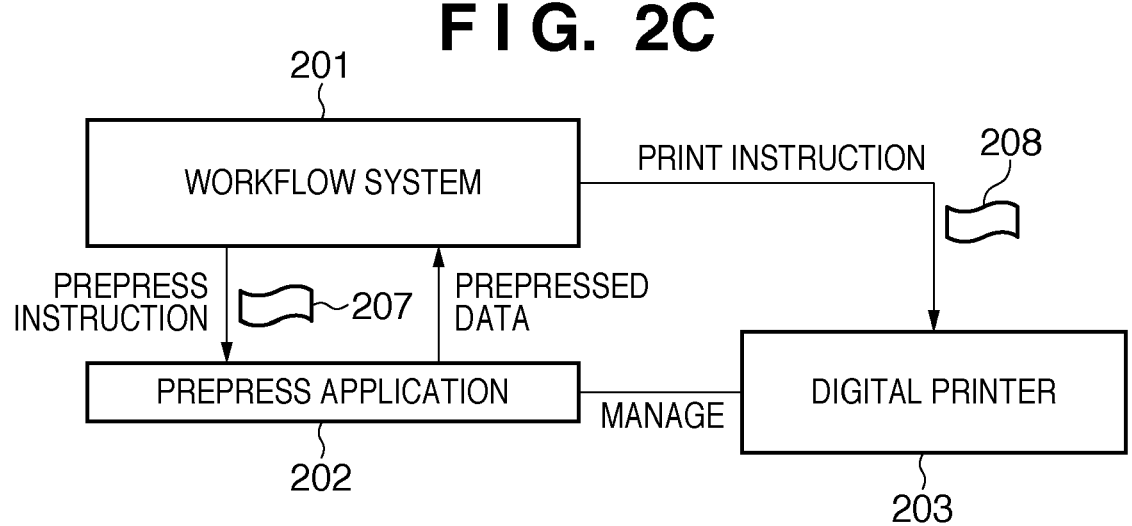
FIG. 2C is a third block diagram showing details of the software configuration on the information processing apparatus.

FIGS. 2A, 2B, and 2C are block diagrams showing details of software configurations on the workflow management PC 101, information processing apparatus 102, and digital printer 103 shown in FIG. 1. A workflow system 201 runs on the workflow management PC 101. A prepress application 202 runs on the prepress PC 102 that performs a prepress process such as an imposition process for a job received from the workflow system. A digital printer 203 receives a prepressed print job and executes the actual print process. Note that FIGS. 2A, 2B, and 2C explicitly illustrate a plurality of cases of job flow implemented by the printing system.

The case in FIG. 2A will be explained. The workflow system 201 issues, to the prepress application 202, an instruction of printing and a prepress process such as an imposition process using a job ticket 204 to be described later. Upon receiving the instruction, the prepress application 202 performs the instructed prepress process, and issues a print instruction to the digital printer 203 using a job ticket 205. The digital printer 203 executes the print process in accordance with the contents of the received job ticket 205.

The case in FIG. 2B will be explained. The workflow system 201 requests a prepress process such as an imposition process of the prepress application 202 using a job ticket 206 to be described later. Upon receiving the instruction, the prepress application 202 performs the prepress process, and transmits the prepressed data to the workflow system 201.

The case in FIG. 2C will be explained. The workflow system 201 requests a prepress process such as an imposition process of the prepress application 202 using a job ticket 207 to be described later. Upon receiving the instruction, the prepress application 202 performs the prepress process, and transmits the prepressed data to the workflow system 201. The prepressed data received from the prepress application 202 is then transmitted to the digital printer 203 using a job ticket 208 and printed by the digital printer 203.

Figure 3:
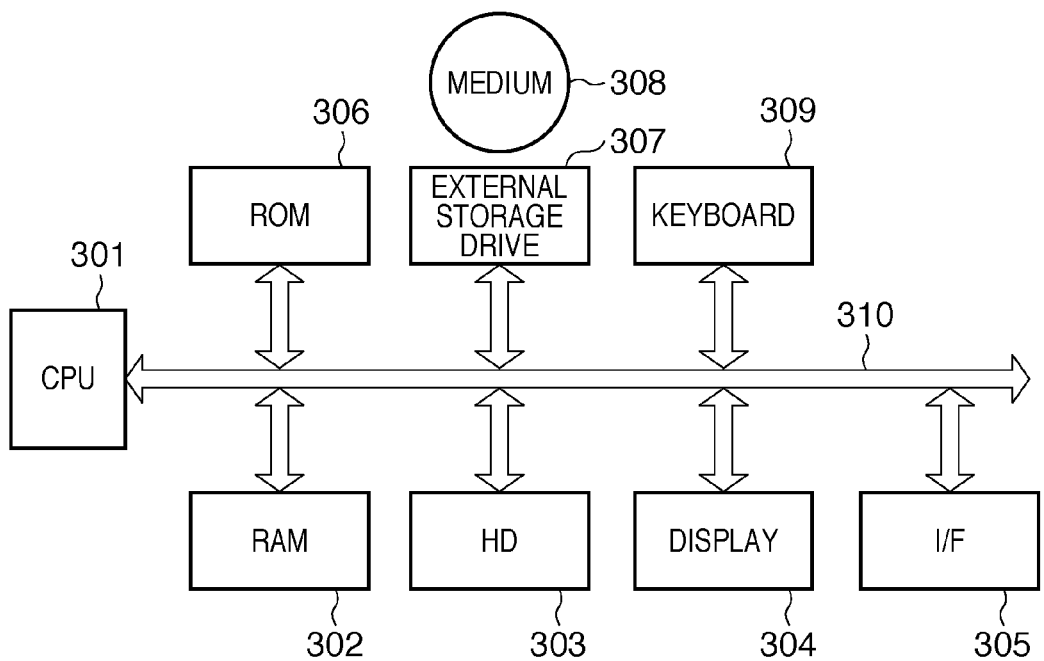
FIG. 3 is a block diagram showing the schematic arrangement of the information processing apparatus in which a prepress application functions.

FIG. 3 is a block diagram showing the schematic arrangement of the information processing apparatus in which the prepress application 202 functions. A CPU 301 executes application programs, OS, network printer control programs, and the like stored in a HD 303, for example, hard disk, and controls to temporarily store, in a RAM 302, information, files, and the like necessary for program execution. A ROM 306 stores programs such as a basic I/O program and various kinds of data including font data to be used in document processing. The RAM 302 functions as, for example, the main memory and work area of the CPU 301. An external storage drive 307 can load a program and the like stored in a medium 308 to the computer system.

Figure 4:
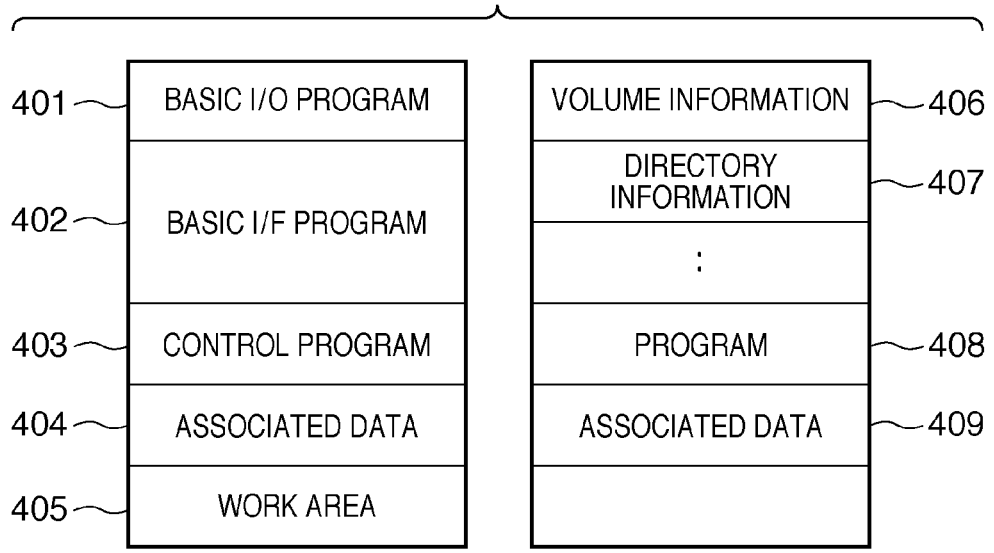
FIG. 4 is a view showing an example of a memory map and data stored in the information processing apparatus.

The medium 308 serves as a storage medium and stores programs and associated data to be described in this embodiment. FIG. 4 shows the structure of stored contents. The HD 303 stores application programs, OS, control programs, associated programs, and the like. A keyboard 309 serves as a user interface to be used by the operator of the information processing apparatus to input, for example, instructions such as a device control command. A display 304 displays a command input via the keyboard 309, a printer status, and the like.

A system bus 310 controls the flow of data in the computer. A network interface (to be referred to as an I/F hereinafter) 305 serves as a communication interface that connects the system to a local area network (LAN) or the Internet.

FIG. 4 is a view showing an example of a memory map and data stored in the information processing apparatus. The left side of FIG. 4 illustrates a memory map when the program for processing corresponding to the embodiment is loaded to the RAM 302 and made executable. In this embodiment, an example will be described in which the programs and associated data are directly loaded from the medium 308 to the RAM 302 and executed. Otherwise, every time the program of the present invention is invoked from the medium 308, it may be loaded from the HD 303 to the RAM 302.

The medium that records the program of the present invention may be an FD, CD-ROM, DVD, IC memory card, or the like. Alternatively, the program of the present invention may be recorded in the ROM 306 to form a part of the memory map and executed directly by the CPU 301.

Reference numeral 401 denotes a basic I/O program. This area stores a program having, for example, an IPL (Initial Program Loading) function, which is loaded from the HD 303 to the RAM 302 to start the operation of the OS when the information processing apparatus is powered on. Reference numeral 402 denotes an OS; and 403, a control program. Associated data is rasterized in an area 404. A work area where the CPU 301 executes the program is allocated in an area 405.

The right side of FIG. 4 illustrates an example of data contents stored in the medium 308. Reference numeral 406 denotes volume information representing data information; 407, directory information; 408, a program to be explained in this embodiment; and 409, associated data of the program. The program 408 includes program codes based on the flowcharts of the processing program shown in FIGS. 11 and 12.

Figure 5:
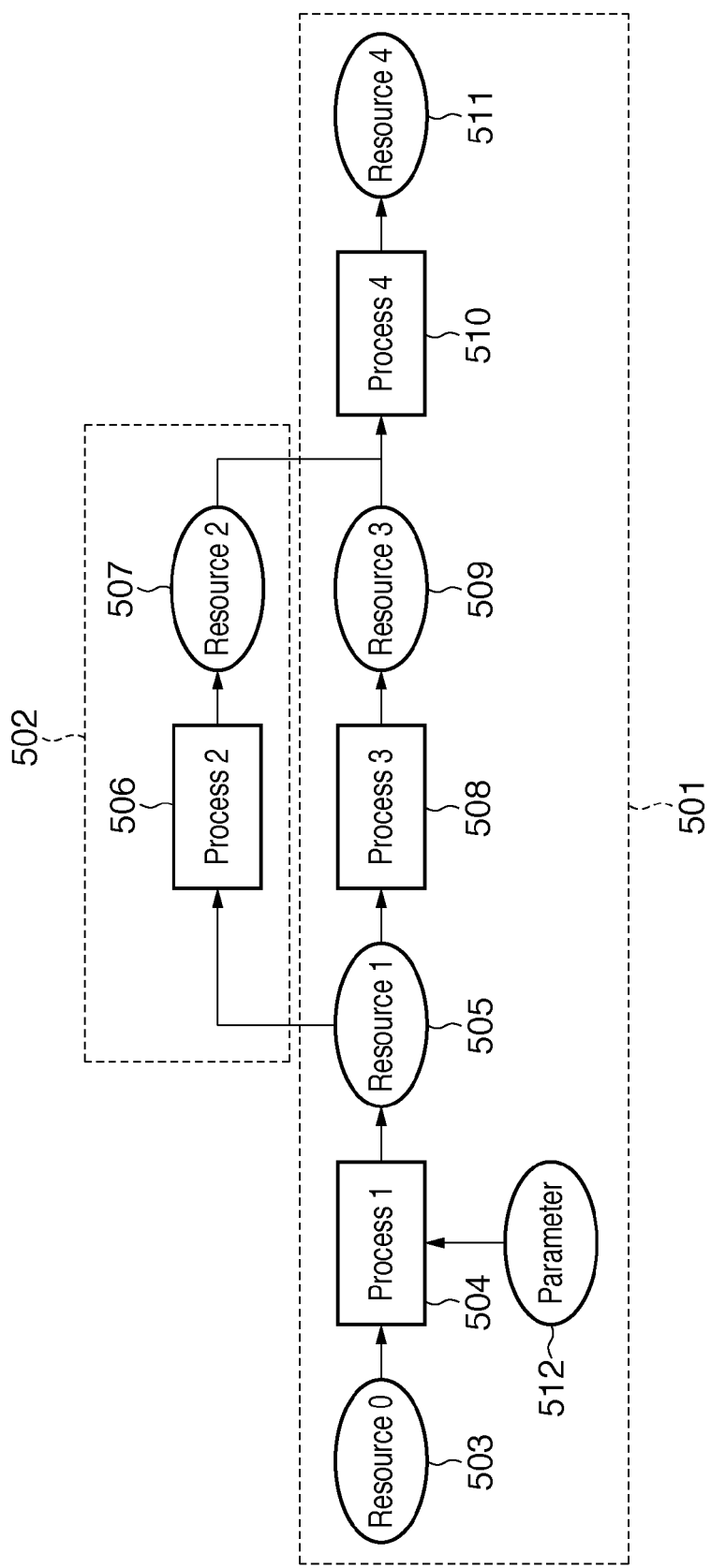
FIG. 5 is a view showing an example of the general structure of job tickets 204, 206, 207 and 208 shown in FIGS. 2A, 2B, and 2C.

FIG. 5 is a view showing an example of the general structure of the job tickets 204, 206, 207 and 208 shown in FIGS. 2A, 2B, and 2C. Note that an example of a general-purpose job ticket having the structure of the example is the JDF (Job Definition Format). However, the present invention is not limited to the JDF. "Process" in FIG. 5 represents a process subject that performs part of a job process. "Resource" is defined as a resource a process subject consumes or outputs.

Resource_0 503 is input to Process_1 504. The Process_1 504 generates Resource_1 505 as an output. The Resource_1 505 is input to Process_2 506 and Process_3 508. Both Resource_2 507 output from the Process_2 506 and Resource_3 509 output from the Process_3 508 are input to Process_4 510. As a result, Resource_4 511 is output as a final product.

In the structure shown in FIG. 5, the entire job ticket is divided into a processing system 501 and a processing system 502. More specifically, the processing system 502 executes the Process_2 506 using the Resource_1 505 as the input resource and generates the Resource_2 507. On the other hand, the processing system 501 starts with the input of the Resource_0 503. The processing system 501 generates the Resource_4 511 as the final product using, as inputs, the Resource_2 507 output from the processing system 502 and the Resource_3 509 output from the Process_3 508. There exist two processing systems, for example, the processing system 501 and the processing system 502. Each processing system will be referred to as a "node" hereinafter. The job ticket as in this example will be referred to as a job ticket of a multi-node. That is, the job ticket of this example is a job ticket of the multi-node including the two nodes 501 and 502.

A parameter resource 512 that defines the operation of a process can be set for each of the processes 504, 506, 508, and 510.

In this embodiment, the parameter that defines the operation of a process is set via a user interface displayed by the prepress application 202.

Figure 6:
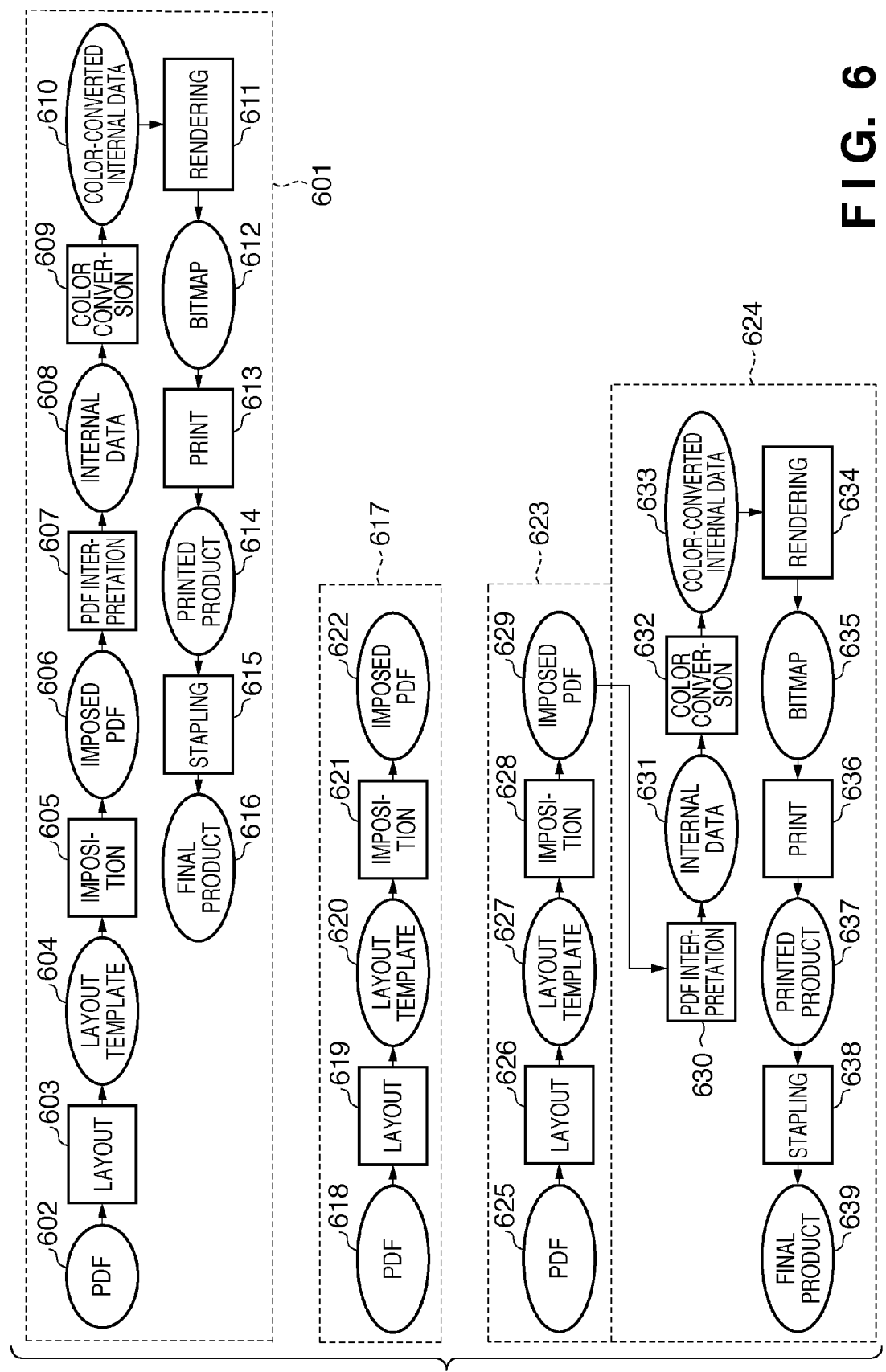
FIG. 6 is a view showing an example of the job tickets 204, 206, and 207 shown in FIGS. 2A, 2B, and 2C.

Process nodes 601, 617, 623, and 624 shown in FIG. 6 are examples of the job tickets 204, 206, and 207 shown in FIGS. 2A, 2B, and 2C. A job ticket has the structure shown in FIG. 5. The process node 601 in FIG. 6 is an example of the job ticket 204 input to the prepress application 202. Referring to FIG. 6, the job ticket is interpreted as follows. In FIG. 6, as indicated by the process node 601, the job ticket is formed from one node, and the prepress application interprets all processes of the node. Note that the job ticket is sometimes called instruction data because it instructs execution of a plurality of processes.

When a specific PDF file 602 is input, a layout process 603 is executed. The layout process 603 generates a layout template 604 that defines the actual layout method. The prepress application imposes the PDF file 602 in an imposition process 605 using the layout template 604.

The imposition process 605 outputs an imposed PDF 606. The imposed PDF 606 is input to a PDF interpretation process 607. The PDF interpretation process 607 converts the PDF data into internal data 608. The PDF interpretation process serves as a PDF interpreter and converts the PDF data into internal data like a display list. A color conversion process 609 performs color conversion of the internal data output from the PDF interpretation process 607. In this color conversion, for example, color data is converted into monochrome data.

After that, the prepress application recognizes that rendering processing of inputting color-converted internal data 610 generated by the color conversion process 609 to a rendering process 611 is executed. The rendering process 611 interprets the color-converted internal data 610 and generates bitmap data 612 to be actually printed. The bitmap data 612 undergoes actual print processing on a physical paper sheet in a print process 613 so as to generate a printed product 614. A stapling process 615 executes stapling using, for example, staples for the printed product 614 so that a stapled product 616 is generated finally. However, the prepress application determines, based on the capability information of its own, that processes from the rendering process 611 are the processes of the printer, and does not execute the actual processing except analyze the job ticket.

The process node 617 in FIG. 6 is an example of the job ticket 206 input to the prepress application 202. In the process node 617 of FIG. 6, the job ticket is interpreted as follows. The prepress application 202 executes a layout process 619 using an input specific PDF 618. Using a layout template 620 generated by executing the layout process 619, the prepress application executes an imposition process 621 for the input PDF 618, and outputs an imposed PDF 622.

Processes/resources 625 to 639 in FIG. 6 are the same as the processes/resources 602 to 616, and a different point will be explained. Unlike the job ticket represented by the process node 601 in FIG. 6, the job ticket represented by the process nodes 623 and 624 in FIG. 6 has a multi-node structure including the process node 623 up to the imposition process 628 and the process node 624 from the PDF interpretation process 630. Upon receiving the job ticket represented by the process nodes 623 and 624, the prepress application 202 of this embodiment interprets only the node 623.

Figure 7:
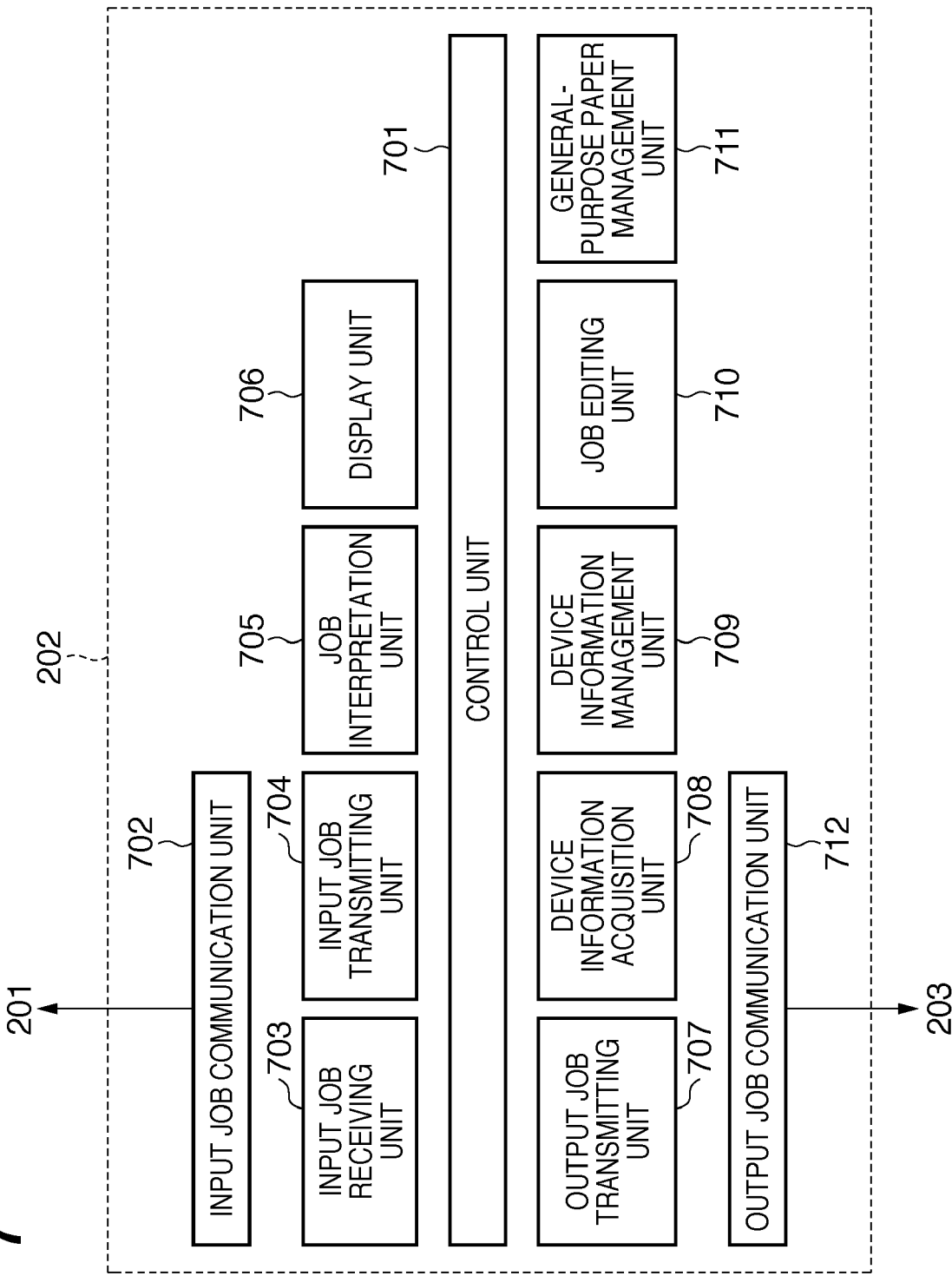
FIG. 7 is a block diagram showing the software configuration of a prepress application 202.

FIG. 7 is a block diagram showing the software configuration of the prepress application 202 shown in FIGS. 2A, 2B, and 2C. The prepress application 202 of this embodiment receives a job from the workflow system 201, and dynamically changes, based on the contents of the job ticket, a user interface to be displayed. The prepress application 202 includes the following functional processing units under the comprehensive control of a control unit 701.

The prepress application 202 includes an input job communication unit 702 which communicates with the workflow system 201, an input job receiving unit 703 which receives a job from the workflow system 201 via the input job communication unit 702, and a job interpretation unit 705 which interprets the received job. The prepress application 202 also includes a display unit 706 which displays a user interface to be described later based on the contents of the job interpreted by the job interpretation unit 705, and a job editing unit 710 which edits the job in accordance with the set values of the user interface displayed by the display unit 706. The prepress application 202 further includes an output job transmitting unit 707 which transmits the edited job to the digital printer 203 via an output job communication unit 712, and an input job transmitting unit 704 which transmits the edited job to the workflow system 201 via the input job communication unit 702. The prepress application 202 also includes a device information acquisition unit 708 which acquires the information of the digital printer 203 via the output job communication unit 712, and a device information management unit 709 which manages the device information acquired from the device information acquisition unit 708. The prepress application 202 also includes a general-purpose paper management unit 711 that manages general-purpose paper information to be described later. Note that the functions shown in FIG. 7 will be described later in detail together with flowcharts.

Figure 8A:
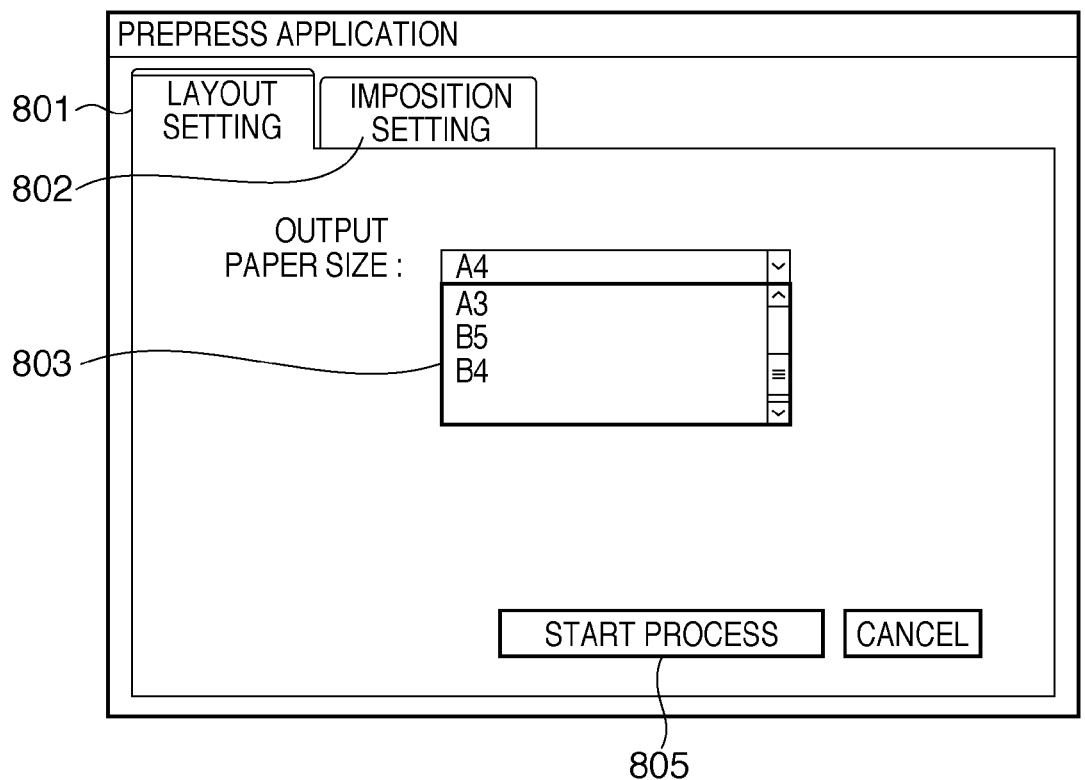
FIG. 8A is a view showing an example of the user interface of the prepress application upon receiving a job represented by the job ticket in FIG. 6.
Figure 8B:
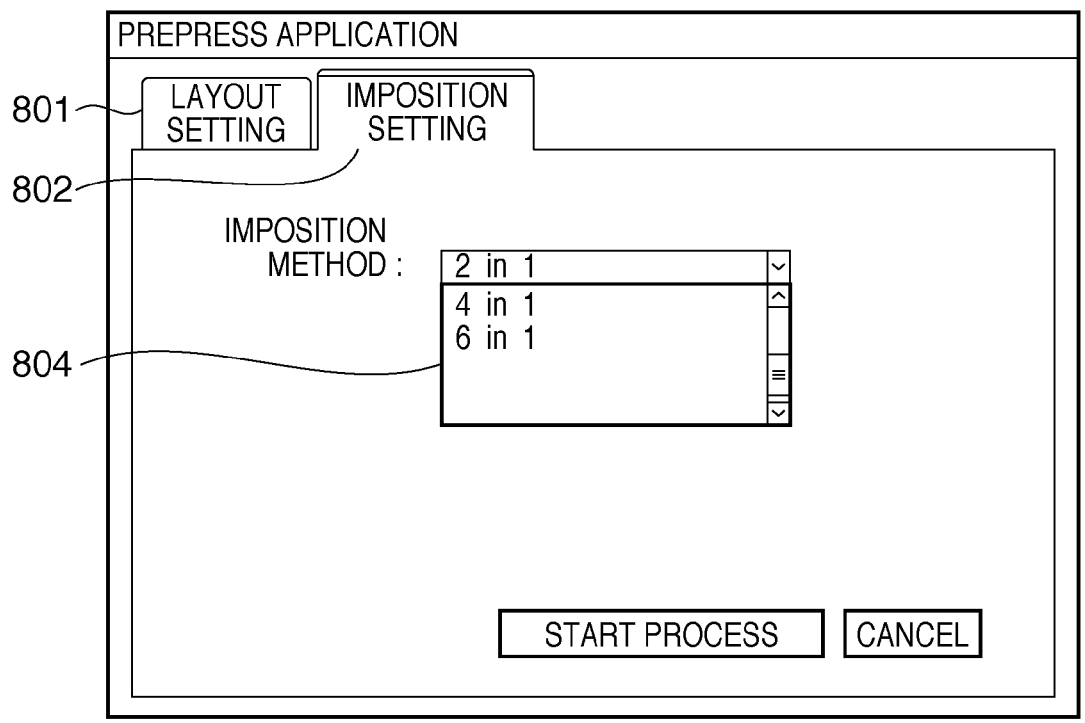
FIG. 8B is a view showing an example of the user interface of the prepress application upon receiving the job represented by the job ticket in FIG. 6.
Figure 9A:
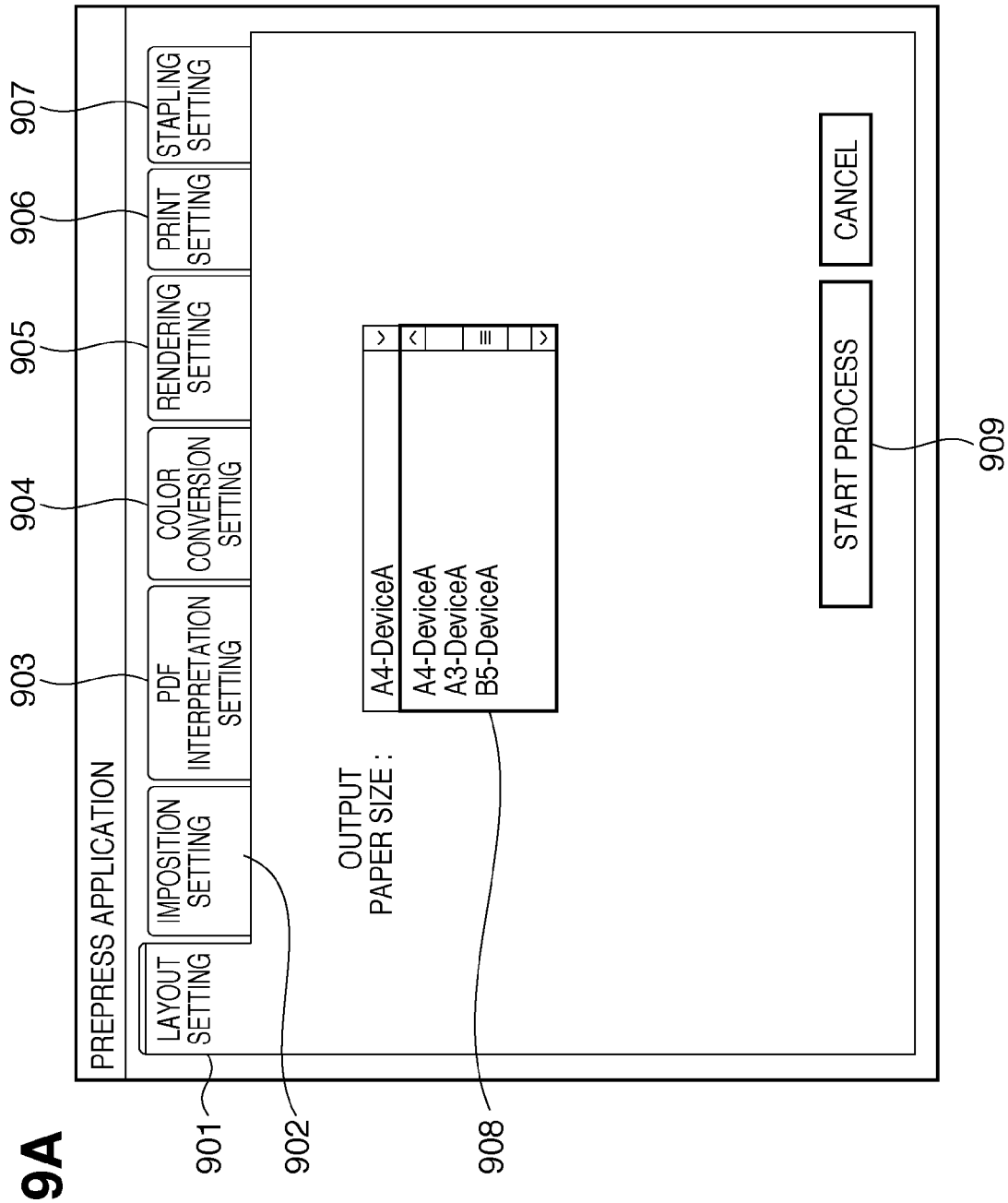
FIG. 9A is a view showing an example of the user interface of the prepress application upon receiving the job represented by the job ticket in FIG. 6.
Figure 9B:
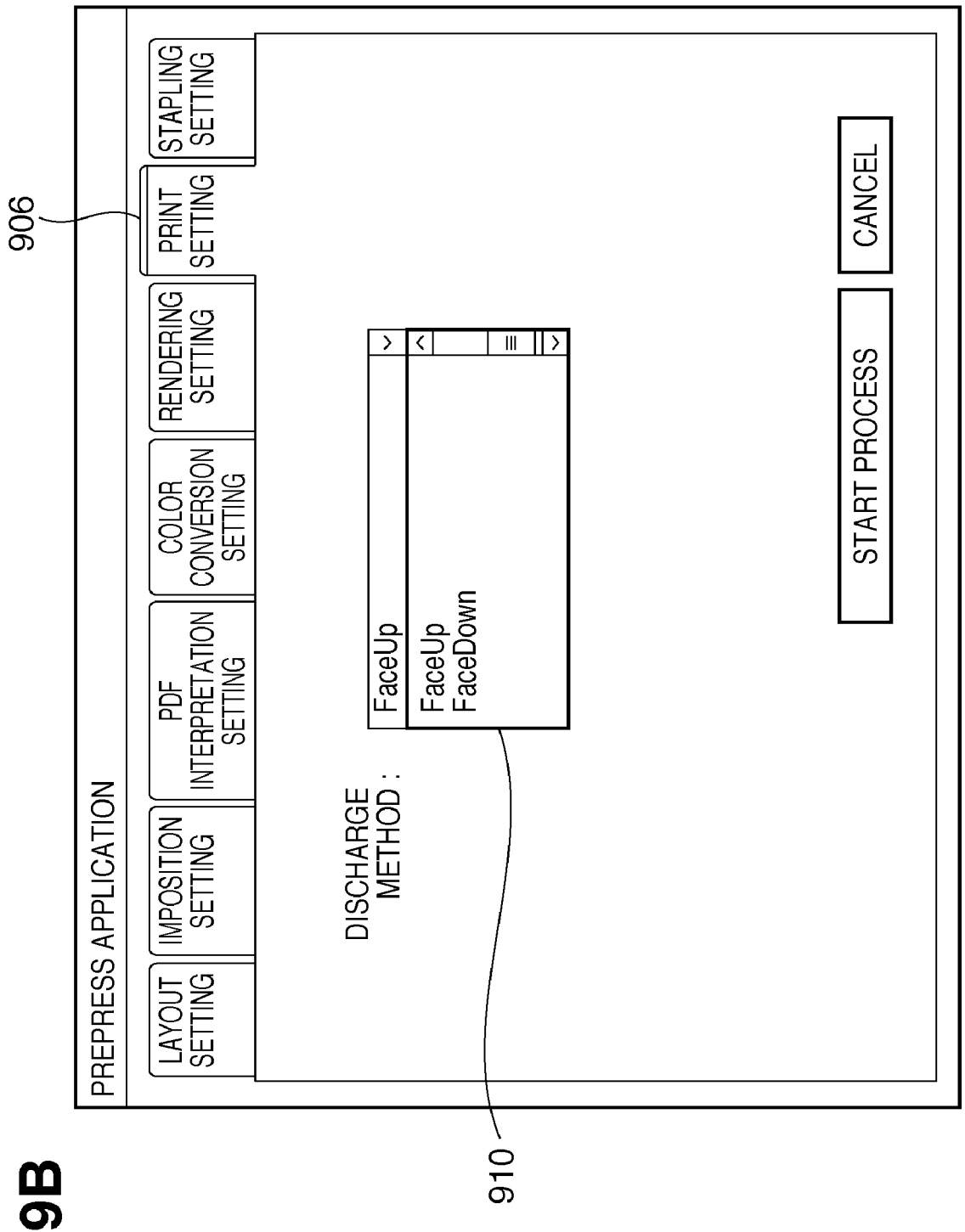
FIG. 9B is a view showing an example of the user interface of the prepress application upon receiving the job represented by the job ticket in FIG. 6.
Figure 10:
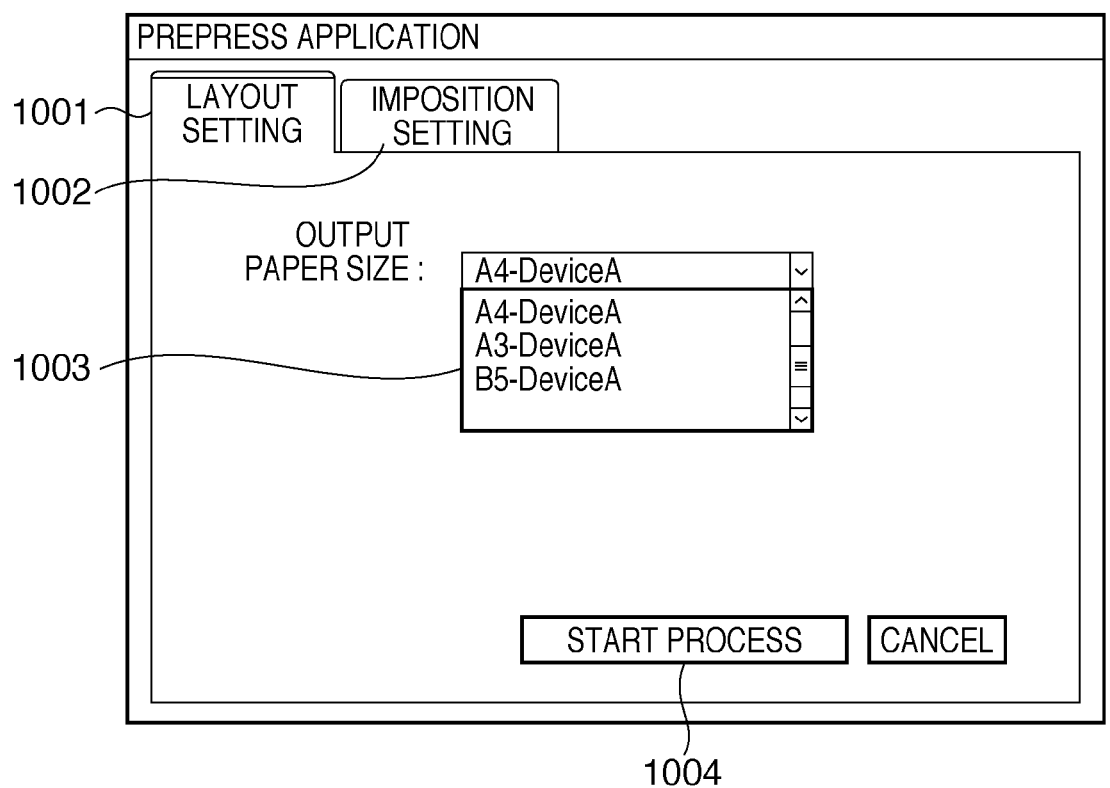
FIG. 10 is a view showing an example of the user interface of the prepress application upon receiving the job represented by the job ticket in FIG. 6.

FIGS. 8A and 8B are views showing an example of a user interface (setting window) displayed when the prepress application 202 has received a job ticket represented by the process node 617 in FIG. 6 from the workflow system 201. The user sets the contents of each process via the user interface. FIGS. 9A and 9B are views showing an example of a user interface displayed when the prepress application 202 has received a job ticket represented by the process node 601 in FIG. 6 from the workflow system 201. FIG. 10 is a view showing an example of a user interface displayed when the prepress application 202 has received a job ticket represented by the process nodes 623 and 624 in FIG. 6 from the workflow system 201. Note that the user interface shown in FIGS. 8A to 10 will be described later in detail.

Figure 11:
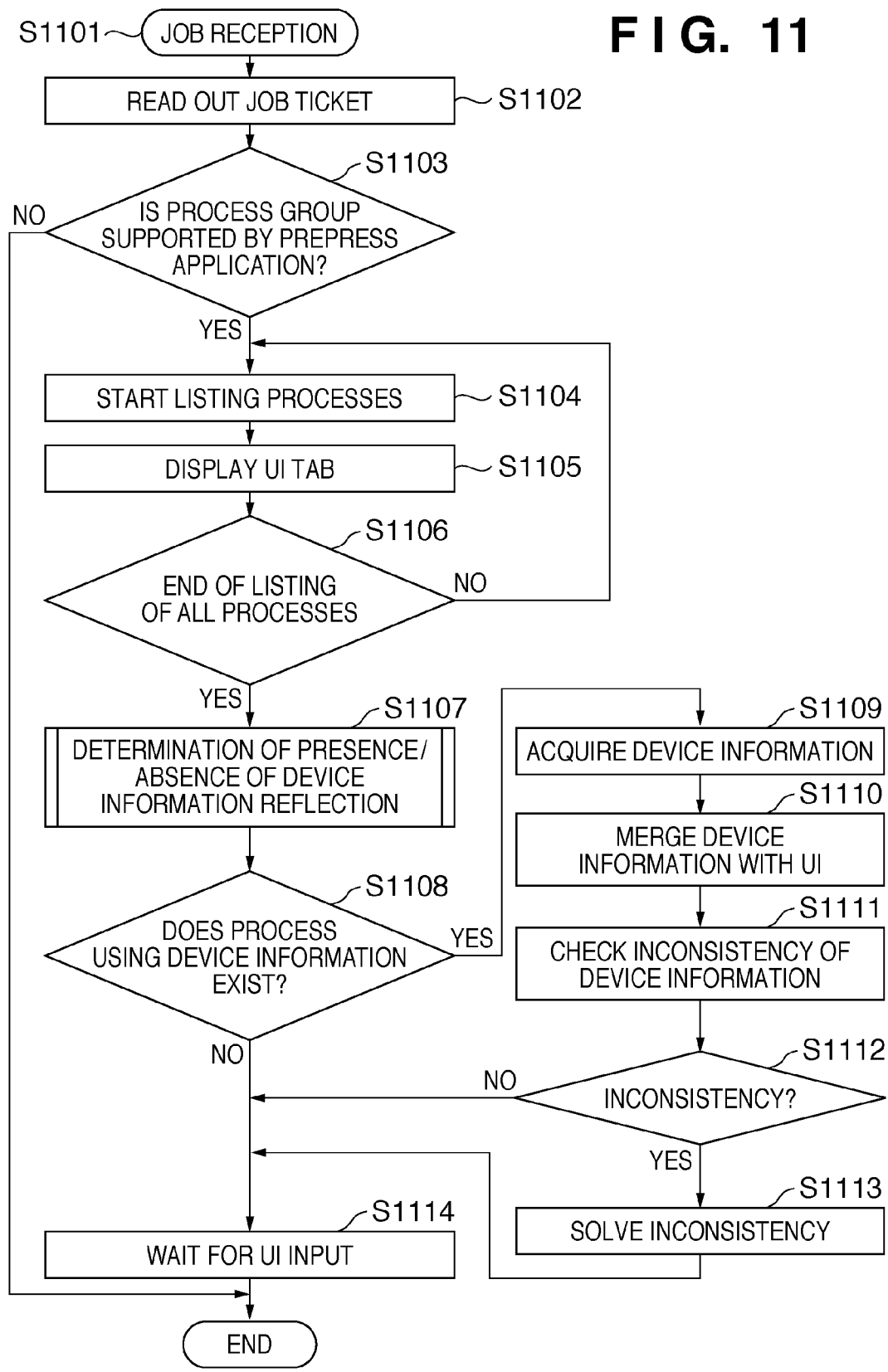
FIG. 11 is a flowchart illustrating the procedure of the user interface control operation of the prepress application according to the embodiment.
Figure 12:
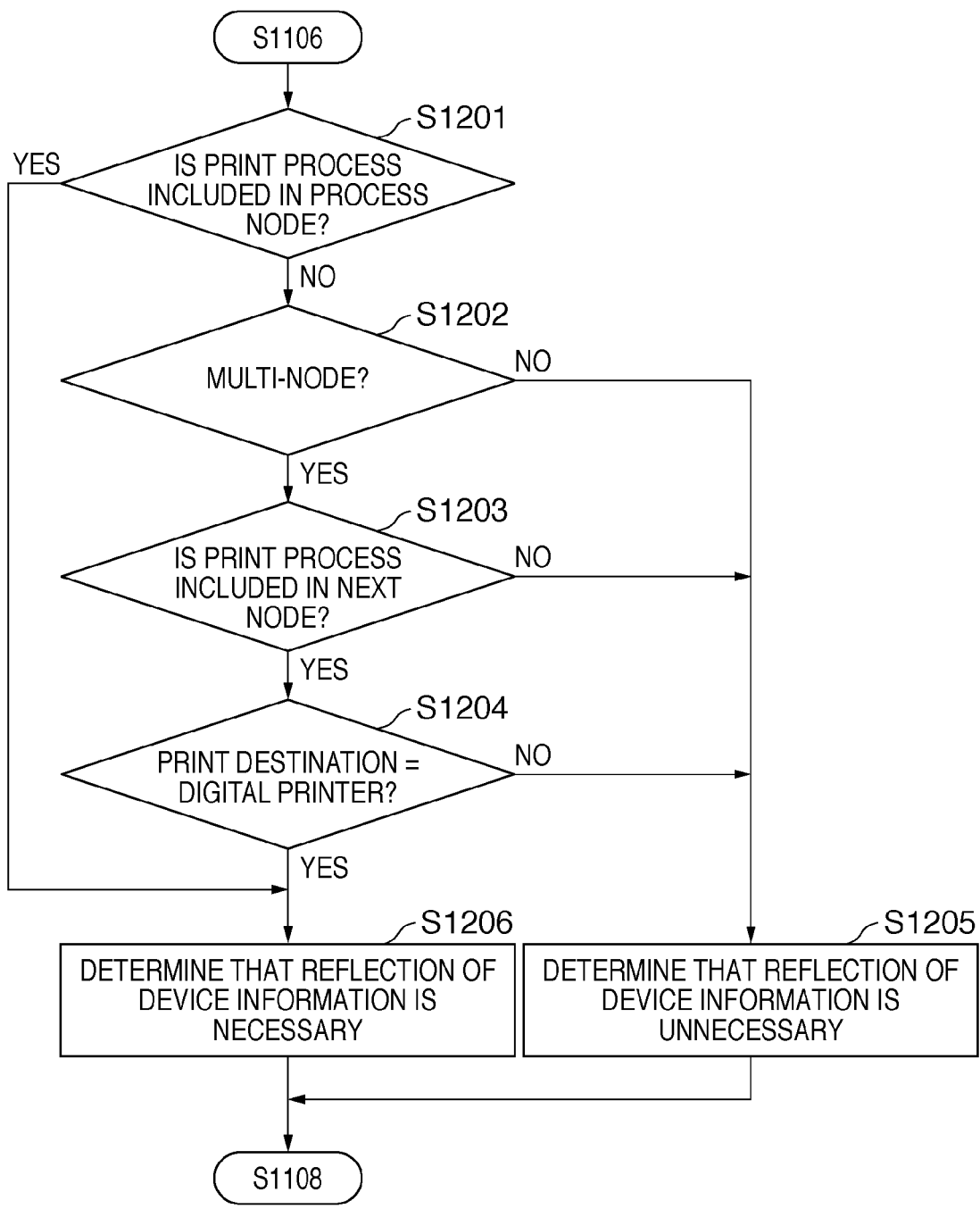
FIG. 12 is a flowchart illustrating the procedure of the operation of a process in step S1107 of FIG. 11.

FIGS. 11 and 12 are flowcharts illustrating the procedure of the user interface control operation of the prepress application 202.

In step S1101, the input job receiving unit 703 receives a job from the workflow system 201 via the input job communication unit 702. In step S1102, the job interpretation unit 705 reads out the received job and interprets the job ticket.

In step S1103, the job interpretation unit 705 determines whether the process group described in the job ticket is processable by itself (prepress application). The process in step S1103 is executed by determining, for example, whether the prepress application can process all the processes 603, 605, 607, 609, 611, 613, and 615 of the job ticket represented by the process node 601 in FIG. 6. More specifically, the determination is done based on the capability information of the prepress application. For example, if the prepress application has a rendering function necessary for the rendering process 611, the rendering process 611 is determined to be processable. However, if the prepress application has no rendering function, the rendering process is determined to be unprocessable. The prepress application has no stapling function but a function of issuing a stapling instruction. Hence, the stapling process is determined to be processable. The process in step S1103 is an example of first determination of the embodiment.

In step S1104, the job interpretation unit 705 holds, as a list, the process group described in the job ticket. In step S1105, the display unit 706 displays, as a user interface, a setting tab corresponding to each process held in the list in step S1104.

If listing of all processes described in the job ticket has not ended in step S1106, the job interpretation unit 705 lists the next process in step S1104. On the other hand, if all processes have been listed in step S1106, the process in step S1107 starts.

In step S1107, the device information management unit 709 determines whether the display unit 706 needs reflection of device information. Note that the device information determination processing in step S1107 is shown in FIG. 12 to be described later. In step S1108, it is determined whether at least one of the processes stored in the list in step S1104 needs reflection of device information. Upon determining that reflection is necessary, the device information management unit 709 acquires device information (to be also referred to as function information hereinafter) from the digital printer 203 via the device information acquisition unit 708 in step S1109. The process in step S1107 is an example of second determination of the embodiment.

In step S1110, the display unit 706 reflects the acquired device information on the UI. The display unit 706 checks the consistency between the settings of the user interface in step S1111, and then determines in step S1112 whether inconsistency has occurred. Upon determining that inconsistency exists between the settings, the CPU 301 solves the inconsistency between the settings in step S1113. In step S1114, the setting information whose inconsistency has been solved in step S1113 is displayed on the user interface. Upon determining in step S1112 that no inconsistency exists between the settings, the setting information is displayed on the user interface in step S1114.

FIG. 12 is a flowchart illustrating the procedure of processing of determining in step S1107 whether reflection of device information is necessary. The job interpretation unit 705 executes processes in steps S1201 to S1206 to be described below.

When all processes in the job ticket have been interpreted in step S1106 of FIG. 11, the process advances to step S1201. In step S1201, the job interpretation unit 705 determines whether in the job ticket received from the workflow system 201, the node to be processed by the prepress application 202 includes a print process. The print process is, for example, the print process 613 shown in FIG. 6. Upon determining that the process node includes a print process, the final output destination of the job is determined to be a digital printer. In step S1206, it is determined that the job ticket uses device information.

On the other hand, upon determining that the process node of its own includes no print process, the job interpretation unit 705 determines, in step S1202, the presence/absence of a process node to which the output from the process node of its own is input (for example, whether a multi-node structure represented by the processes 623 and 624 in FIG. 6 exists). Upon determining that there is a process node to which the output from the process node of its own is input, the process advances to step S1203. On the other hand, upon determining that there is no process node to which the output from the process node of its own is input, the process advances to step S1205 to determine that the job ticket uses no device information.

In step S1203, the job interpretation unit 705 determines the process node to which the output from the process node of its own is input includes a print process (for example, the print process 636 shown in FIG. 6). Upon determining that the process node includes a print process, the process advances to step S1204. On the other hand, upon determining that the process node includes no print process, the process advances to step S1205 to determine that the job ticket uses no device information.

In step S1204, it is determined whether a print destination such as the digital printer has been designated. Upon determining that the print destination has been designated, the process advances to step S1206 to determine to use device information. If it is determined that the print destination is not a digital printer, the process advances to step S1205 to determine that the job ticket uses no device information. After the process in step S1205 or S1206, the process advances to step S1108 in FIG. 11.

FIGS. 8A and 8B are views showing an example of the user interface of the prepress application 202 upon receiving a job represented by the job ticket of the process node 617 in FIG. 6. As shown in FIG. 8A, the user interface includes two tabs 801 and 802. The tab 801 is a user interface to set the operation of the layout process 619. The tab 802 is a user interface to set the operation of the imposition process 621. A user interface 803 is used to set the set item of the layout process. The item designates the output paper size so as to set the paper size after layout. When the user sets "A3" in this item, the final output paper size changes to A3.

FIG. 8B shows a user interface to set the operation of the imposition process 621. An item 804 sets the operation of the imposition process. In this setting, for example, when the user designates "2 in 1" in the item 804, an imposition process of allocating two logical pages per physical page as imposed data is executed for the imposed PDF 622. When the user sets the items 803 and 804 and presses a process start button 805, the prepress application 202 finally creates, as the imposed PDF 622, a PDF file in which two pages are imposed on one page of PDF in A3 size. The created imposed PDF 622 is transmitted to the workflow system 201.

FIGS. 11 and 12 will be explained below in detail with reference to the user interface display examples.

In step S1101, the input job receiving unit 703 receives a job represented by the job ticket of the process node 617 in FIG. 6 from the workflow system 201 via the input job communication unit 702. In step S1102, the job interpretation unit 705 reads out and interprets the job ticket of the received job. In step S1103, the job interpretation unit 705 determines whether the process group described in the job ticket are processable by the prepress application 202 itself. In this example, the layout process 619 and the imposition process 621 are designated. Based on the capability information of its own, the prepress application determines that the processes 619 and 621 are processable.

In step S1104, the job interpretation unit 705 stores, as a list, the process group described in the job ticket. Since the layout process 619 is listed in step S1104, the display unit 706 displays the layout setting tab 801 as a user interface in step S1105.

Since listing of all processes described in the job ticket has not ended in step S1106, the job interpretation unit 705 adds the next imposition process 621 to the list in step S1104. Similarly, in step S1105, the display unit 706 displays the imposition setting tab 802 as a user interface. When it is determined in step S1106 that all processes have been listed, the process advances to step S1107.

In step S1107, the device information management unit 709 determines whether the display unit 706 needs to reflect device information. In this embodiment, it is determined in step S1201 of FIG. 12 whether the process node includes a print process. Since the job ticket represented by the process node 617 in FIG. 6 includes no print process, the process advances to step S1202. In step S1202, the job ticket of this example does not have, for example, the multi-node structure as represented by the process nodes 623 and 624 in FIG. 6. Hence, the process advances to step S1205 to determine that the job ticket does not require reflection of device information.

Next, it is determined in step S1108 of FIG. 11 that none of the processes requires reflection of device information, and the process advances to step S1114. In step S1114, user interface display processing is performed. In step S1114, pieces of paper information managed by the general-purpose paper management unit 711 and independent of the digital printer are listed in the output paper size 803 (an example of first display and first display control).

Note that when the user presses the process start button 805, the prepress application 202 causes the job editing unit 710 to execute the layout process and the imposition process in accordance with the setting on the user interface. In addition, the prepress application 202 transmits the imposed PDF 622 to the workflow system 201 via the input job transmitting unit 704.

Processing of the prepress application 202 upon receiving a job represented by the job ticket of the process node 601 in FIG. 6 from the workflow system 201 will be described next. The prepress application 202 executes all processes of the process node 601. The outline of the processing is as follows. The prepress application receives the specific PDF 602 from the workflow system 201 and executes the layout process 603 and the imposition process 605 as processes, thereby generating an imposed PDF 606. The generated imposed PDF is transmitted to the digital printer 203 together with the job ticket 205, as shown in FIG. 2A.

Figure 13:
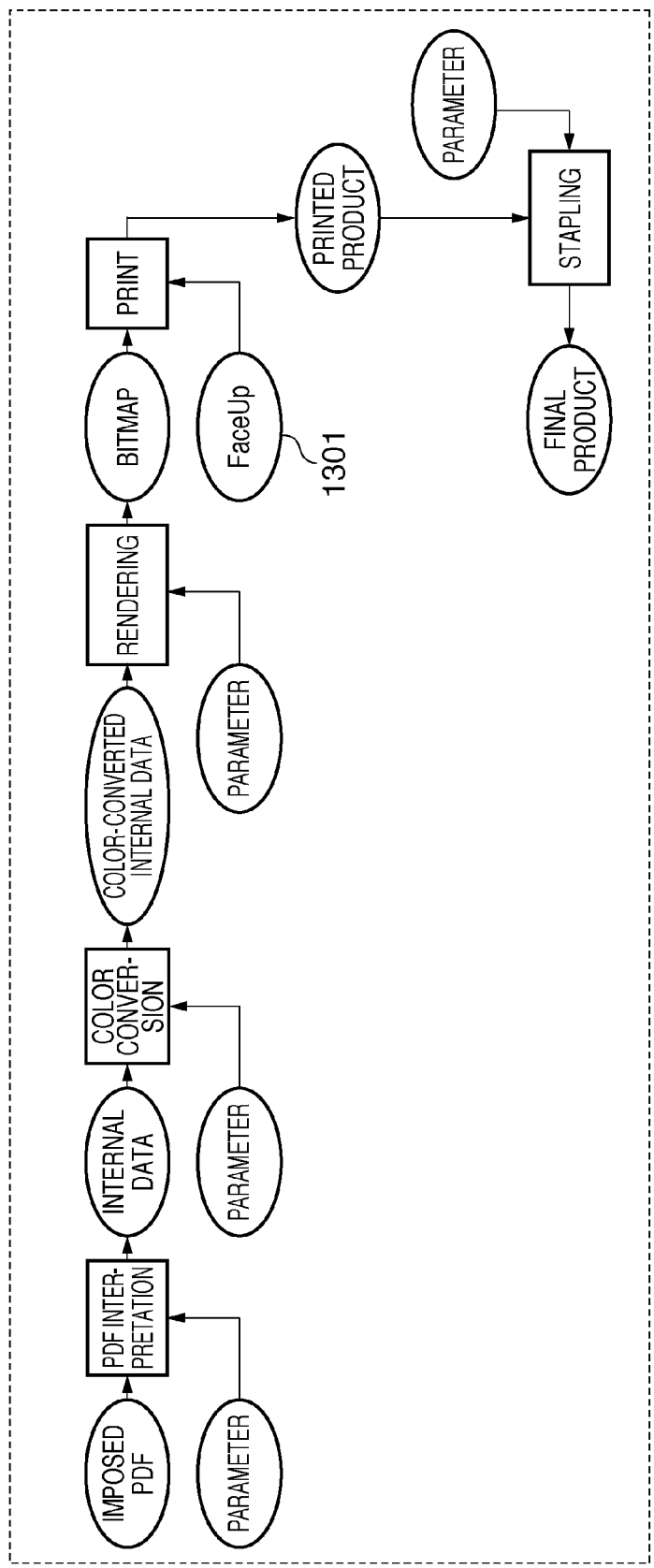
FIG. 13 is a view showing an example of a job ticket the prepress application transmits to a digital printer.

FIG. 13 is a view showing an example of the job ticket 205 at that time. More specifically, the prepress application 202 executes up to the imposition process in the job ticket received from the workflow system 201 and represented by the process node 601 in FIG. 6. The prepress application 202 transmits, to the digital printer 203, the remaining processes as a job ticket for printing.

The prepress application 202 displays a list of set items concerning the processes on a user interface. The set items concerning the processes of this embodiment are the set items of the layout process 603, imposition process 605, PDF interpretation process 607, color conversion process 609, rendering process 611, print process 613, and stapling process 615. Values set in the user interface are described in the job ticket shown in FIG. 13 as the set values for the processes and transmitted to the digital printer 203.

FIGS. 9A and 9B are views showing an example of the user interface of the prepress application upon receiving the job represented by the job ticket of the process node 601 in FIG. 6. As shown in FIG. 9A, this user interface displays the tabs of all processes designated in the job ticket represented by the process node 601 in FIG. 6. A user interface (tab) 901 is used to set the operation of the layout process 603. A user interface (tab) 902 is used to set the operation of the imposition process 605. A user interface (tab) 903 is used to set the operation of the PDF interpretation process 607. A user interface (tab) 904 is used to set the operation of the color conversion process 609. A user interface (tab) 905 is used to set the operation of the rendering process 611. A user interface (tab) 906 is used to set the operation of the print process 613. A user interface (tab) 907 is used to set the operation of the stapling process 615.

A user interface 908 is used to set the set item of the layout process, for example, the item that designates the output paper size so as to set the paper size after layout. When the user sets "A3-DeviceA" in this item, the final output paper size is set to A3-DeviceA. Note that all "A4-DeviceA", "A3-DeviceA", and "B5-DeviceA" are output paper sizes supported by the digital printer 203.

FIG. 9B shows a user interface to set the operation of the print process 613. In this example, the printed product discharge direction (for example, whether to make the printed surface face up) can be set. When the user presses a process start button 909, the prepress application 202 creates, as the imposed PDF 622, a PDF file in which pages are imposed on PDF in A3 size. The settings from the PDF interpretation setting tab 903 to the stapling setting tab 907 are set in the job ticket as parameters of the processes, as shown in FIG. 13, and transmitted to the digital printer 203. Reference numeral 1301 in FIG. 13 indicates a set value for the print process when "FaceUP" is selected as the discharge method of print setting in FIG. 9B.

FIGS. 11 and 12 will be explained below with reference to the user interface display according to the embodiment. In step S1101, the input job receiving unit 703 receives a job represented by the job ticket of the process node 601 from the workflow system 201. The job ticket is interpreted in step S1102. In step S1103, the job interpretation unit 705 determines whether the processes from the layout process 603 to the stapling process 615 are processable. Note that the process group is determined to be processable by the prepress application 202, and the process advances to step S1104.

In step S1104, the layout process 619 is held in a list, and the layout setting tab 901 corresponding to the process held in the list is displayed as a user interface. The above-described process is executed for all processes so that the user interface shown in FIG. 9A is displayed.

In step S1107, since the process node of the job ticket of the process node 617 in FIG. 6 includes the print process 613, it is determined in step S1206 that reflection of device information is necessary.

Hence, device information is acquired via the device information acquisition unit 708 and reflected on the tabs of the user interface.

The items listed in the output paper size 908 in FIG. 9A indicate output paper sizes supported by the device. This is information acquired from the digital printer 203 in step S1109. Pieces of information about the discharge method indicated by 910 in FIG. 9B are also acquired from the digital printer 203 in step S1109, and represent the discharge methods available in the digital printer 203 (an example of second display and second display control).

In step S1111, the display unit 706 checks the consistency between the information acquired from the digital printer and the current set values of the user interface. If it is determined in step S1112 that inconsistency exists, the inconsistency is solved in step S1113. The consistency check of step S1111 detects, for example, a case in which face-up discharge (FaceUP) is not selectable as the discharge method when the "A4-DeviceA" size is set in the output paper size setting 908 because of the limitation of the digital printer. In this case, face-up discharge is made unselectable to solve the inconsistency in step S1113.

When the user presses the process start button 909, the prepress application 202 causes the job editing unit 710 to execute the layout process and the imposition process in accordance with the setting on the user interface, thereby creating the imposed PDF 622. The job editing unit 710 generates a job ticket for the digital printer, which includes the information set by the tabs 903 to 907 of the user interface as parameter information for the digital printer 203. The job editing unit 710 transmits the generated job ticket for the digital printer to the digital printer 203 via the output job transmitting unit 707. FIG. 13 shows an example of the job ticket for the digital printer.

Processing of the prepress application 202 upon receiving a job represented by the job ticket of the process nodes 623 and 624 in FIG. 6 from the workflow system 201 will be described next in detail. Upon receiving the job represented by the job ticket of the process nodes 623 and 624 in FIG. 6, the prepress application 202 executes all processes in the process node 623. The outline of the processing is as follows. The prepress application receives the specific PDF 625 from the workflow system 201, executes the layout process 626 and the imposition process 628 as processes to generate the imposed PDF 629, and transmits the imposed PDF 629 to the workflow system 201. That is, processes concerning the process node 624 that is the next node of the multi-node are not executed. However, based on the job ticket structure, the process node 624 can be determined to be finally processed by the digital printer 203 as the job ticket 208 shown in FIG. 2C. For this reason, in this example, the information of the digital printer 203 is reflected on the user interface of the process node 623.

The prepress application 202 displays, on the user interface, a list of set items of set values of processes (layout process 603 and imposition process 605). At this time, the information of the digital printer 203 is reflected on the set values of the processes.

FIG. 10 is a view showing an example of the user interface of the prepress application upon receiving a job represented by the job ticket of the process nodes 623 and 624 in FIG. 6.

Referring to FIG. 10, the user interface displays the tabs of all processes of the node 623 designated in the job ticket. A user interface (tab) 1001 is used to set the operation of the layout process 626. A user interface (tab) 1002 is used to set the operation of the imposition process 628. A user interface 1003 is used to set the set item of the layout process, for example, the item that designates the output paper size so as to set the paper size after layout. When the user sets "A3-DeviceA" in this item, the final layout is done on the A3-DeviceA size. Note that all "A4-DeviceA", "A3-DeviceA", and "B5-DeviceA" are output paper sizes supported by the digital printer 203 (an example of second display and second display control).

When the user presses a process start button 1004, the prepress application 202 creates, as the imposed PDF 622, a PDF file in which pages are imposed on PDF in A3 size, and transmits it to the workflow system 201.

FIGS. 11 and 12 will be explained below with reference to the user interface display of this example. In step S1101, the input job receiving unit 703 receives a job represented by the job ticket of the process nodes 623 and 624 in FIG. 6 from the workflow system 201 via the input job communication unit 702. In step S1102, the job interpretation unit 705 reads out and interprets the job ticket of the received job. In step S1103, the job interpretation unit 705 determines whether the process group described in the job ticket are processable by the prepress application 202 itself. In this example, the layout process 626 and the imposition process 628 are designated in the process node 623, and the process group is determined to be processable by the prepress application 202. Hence, the process advances to step S1104.

In step S1104, the job interpretation unit 705 lists the process group described in the job ticket. In step S1104, the layout process 626 is listed first. In step S1105, a setting tab corresponding to the listed process, for example, the layout setting tab 1001 is displayed on the display unit 706 as a user interface.

Since listing of all processes described in the job ticket has not ended in step S1106, the job interpretation unit 705 lists the next process, for example, the imposition process 628 in step S1104. In step S1105, the imposition setting tab 1002 is displayed on the display unit 706 as a user interface. If it is determined in step S1106 that all processes have been listed, the process advances to step S1107.

In step S1107, the device information management unit 709 determines whether the display unit 706 needs reflection of device information. In step S1201 of FIG. 12, it is determined whether the process node includes a print process. In this example, since the process node 623 of the job ticket includes no print process, the process advances to step S1202 to determine whether the job ticket is of a multi-node. In step S1202, the job ticket of the process nodes 623 and 624 in FIG. 6 is determined to have the multi-node structure including the process node 624 as the next process. Hence, the process advances to step S1203. In this example, since the node of the next process includes the print process 636, the process advances from step S1203 to step S1204. In step S1204, the output printer of the print process 636 is determined to be the digital printer 203. In step S1206, it is determined that reflection of device information is necessary.

In step S1108 of FIG. 11, it is determined that device information is necessary. Hence, in step S1109, the device information management unit 709 acquires the digital printer information via the device information acquisition unit 708. In step S1110, the digital printer information acquired in step S1109 is reflected on the tabs of the user interface. The items listed in the output paper size 1003 in FIG. 10 indicate output paper sizes supported by the digital printer 203. This is information acquired from the digital printer 203 in step S1109.

In step S1111, the display unit 706 checks the consistency between the information acquired from the digital printer 203 and the current set values of the user interface. If inconsistency exists, it is solved in step S1113. As for the consistency check of step S1111, for example, assume that face-up discharge (FaceUP) is not selectable as the discharge method when the "A4-DeviceA" size is set in the output paper size setting 908 because of the limitation of the digital printer 203. In this case, it is determined in step S1112 that inconsistency exists. In step S1113, face-up discharge is made unselectable. In this example, it is determined in step S1112 that no inconsistency has occurred. The process advances to step S1114 to wait for input on the user interface.

When the user presses the process start button 1004, the prepress application 202 causes the job editing unit 710 to execute the layout process and the imposition process in accordance with the setting on the user interface, thereby creating an imposed PDF 629. The created imposed PDF 629 is transmitted to the workflow system 201 via the input job transmitting unit 704.

As described above, the prepress application acquires information from the output printer in accordance with the contents of a job ticket received from the workflow system, and controls display on the user interface. As a result, when printer information is unnecessary, no printer information is acquired. This solves the overhead.

An optimum user interface is constructed based on the contents of the job ticket received from the workflow system. That is, even when an application function requested from a workflow is a part of the workflow, not all user interfaces of the application are displayed. This improves the convenience of the user.

(Other Embodiments)

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-096457, filed Apr. 10, 2009, which is hereby incorporated by reference herein in its entirety.

What is claimed is:

1. An information processing apparatus that is used in a workflow including processes and that executes the processes of the workflow, the information processing apparatus comprising:

a display unit configured to display parameters of processes of a workflow and accept settings of the parameters;

a first determination unit configured to determine whether the workflow includes a process to be executed by the information processing apparatus;

a second determination unit configured to, when the first determination unit has determined that the workflow includes the process to be executed by the information processing apparatus, determine whether the workflow includes a process to be executed by an external apparatus in accordance with an instruction of the information processing apparatus;

a first display control unit configured to, when the second determination unit has determined that the process to be executed by the external apparatus is not included, control the display unit to display a parameter for only the process to be executed by the information processing apparatus;

an acquisition unit configured to, when the second determination unit has determined that the process to be executed by the external apparatus is included, acquire function information of the external apparatus; and a second display control unit configured to, after the acquisition unit has acquired the function information of the external apparatus, control the display unit to display the parameters of the processes of the workflow while reflecting the function information on the parameters of the processes of the workflow.

2. The information processing apparatus according to claim 1, wherein the external apparatus includes a printer.

3. An information processing method of an information processing apparatus that is used in a workflow including processes and that executes the processes of the workflow, the information processing method comprising steps of:

determining whether a workflow includes a process to be executed by the information processing apparatus;

when it is determined that the workflow includes the process to be executed by the information processing apparatus, determining whether the workflow includes a process to be executed by an external apparatus in accordance with an instruction of the information processing apparatus;

when it is determined that the process to be executed by the external apparatus is not included, displaying a parameter for only the process to be executed by the information processing apparatus;

when it is determined that the process to be executed by the external apparatus is included, acquiring function information of the external apparatus; and after the function information of the external apparatus has been acquired, displaying parameters of processes of the workflow while reflecting the function information on the parameters of the processes of the workflow.

4. A non-transitory computer-readable storage medium storing an information processing program that when executed by a computer causes the computer to perform an information processing method comprising steps of:

determining whether a workflow includes a process to be executed by the information processing apparatus;

when it is determined that the workflow includes the process to be executed by the information processing apparatus, determining whether the workflow includes a process to be executed by an external apparatus in accordance with an instruction of the information processing apparatus;

when it is determined that the process to be executed by the external apparatus is not included, displaying a parameter for only the process to be executed by the information processing apparatus;

when it is determined that the process to be executed by the external apparatus is included, acquiring function information of the external apparatus; and after the function information of the external apparatus has been acquired, displaying parameters of processes of the workflow while reflecting the function information on the parameters of the processes of the workflow.

* * * * *